Jan. 25, 1966  W. RITZERFELD ETAL  3,230,857
COPY MAKING MACHINE AND COPYING METHOD
Filed July 10, 1962  13 Sheets-Sheet 6

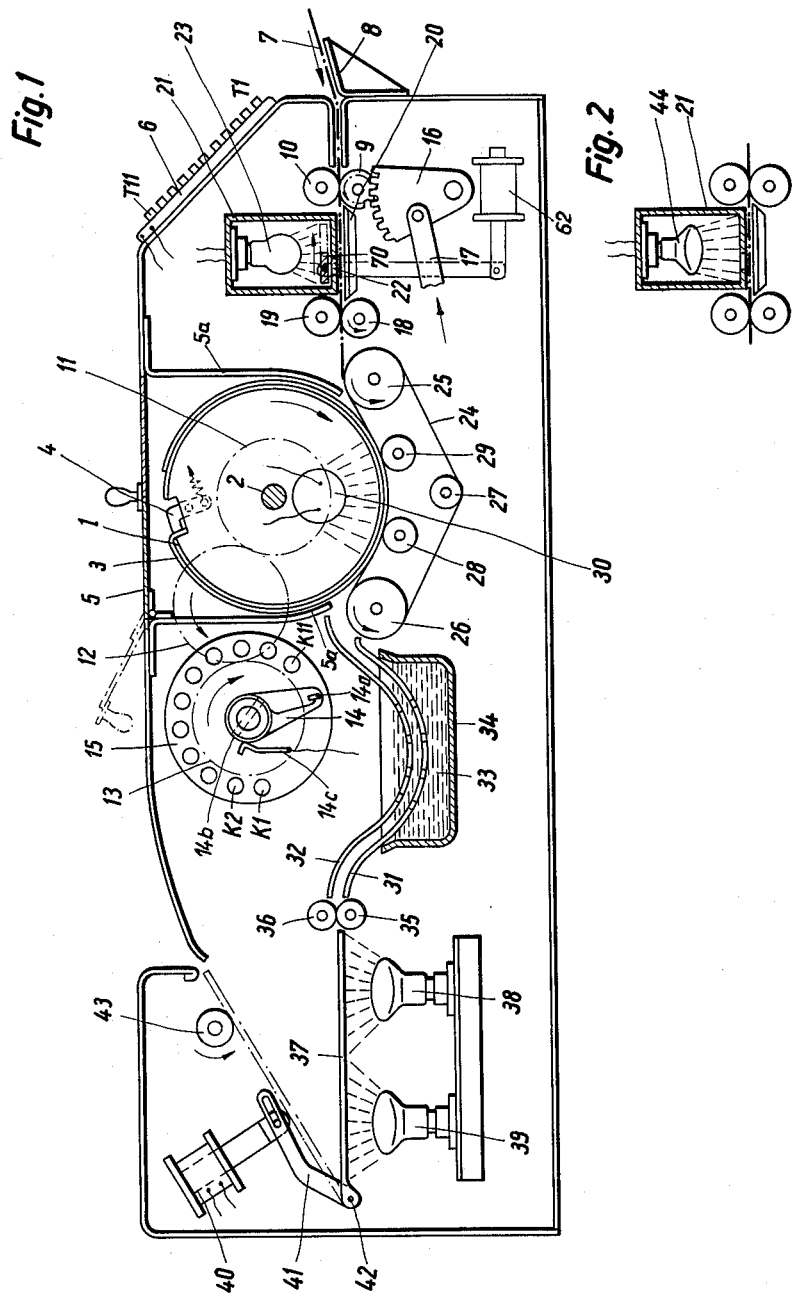

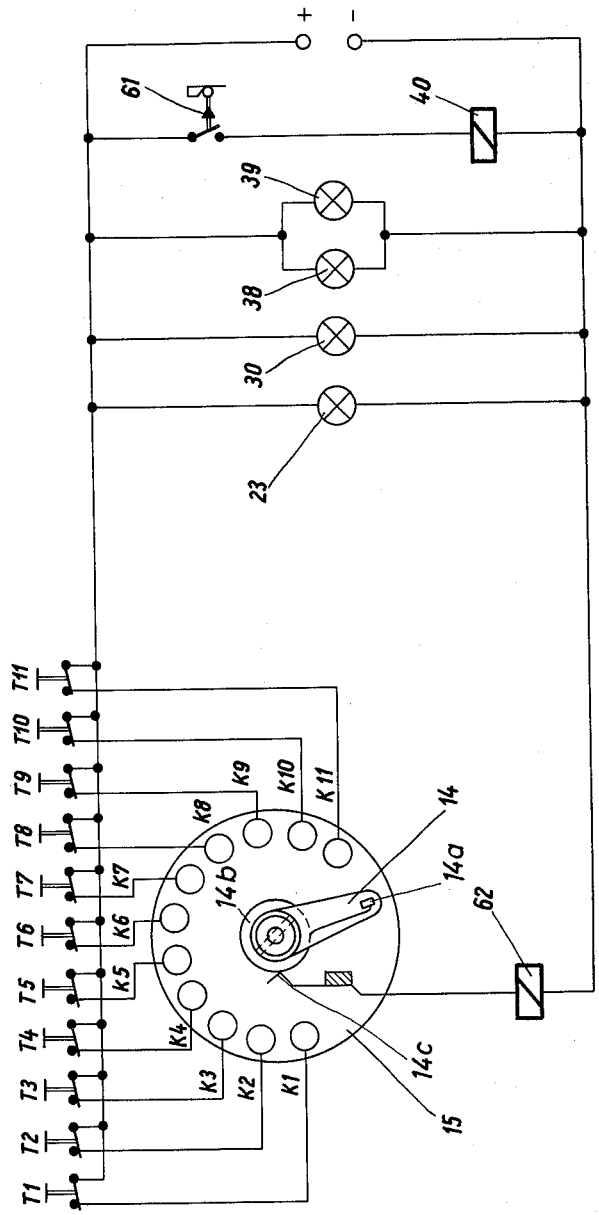

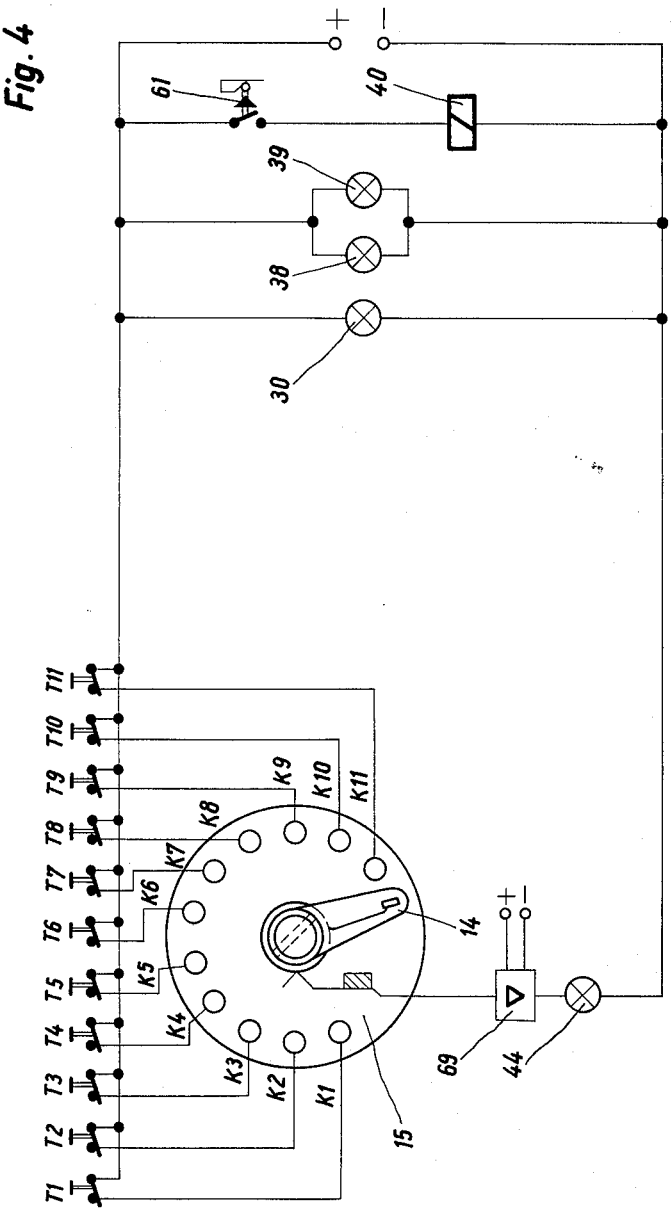

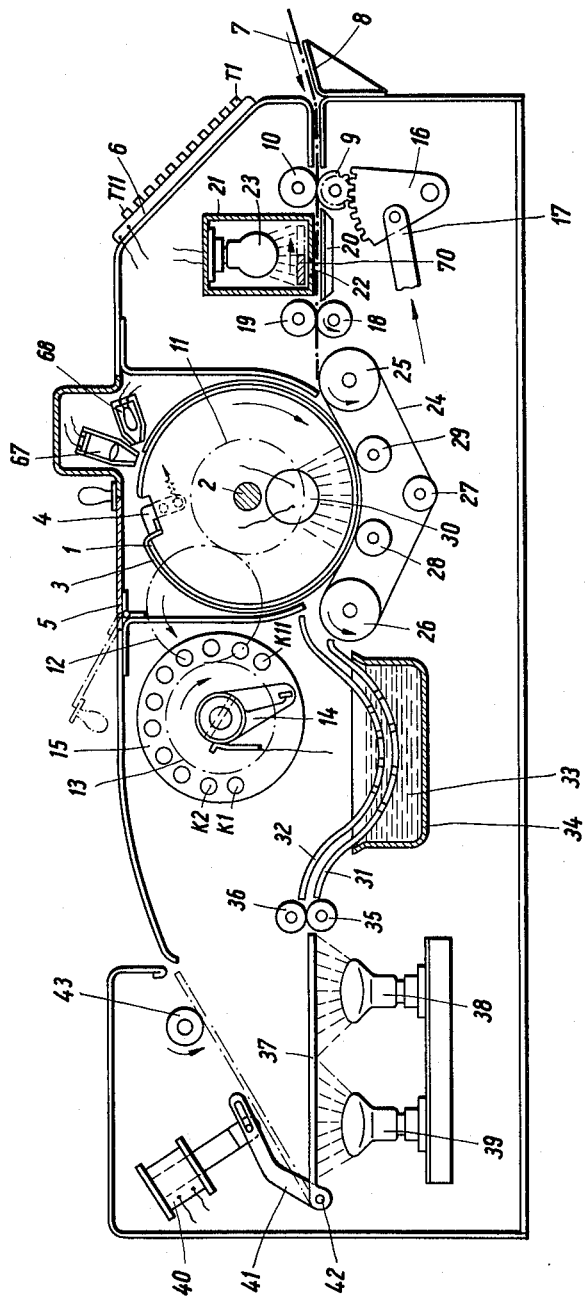

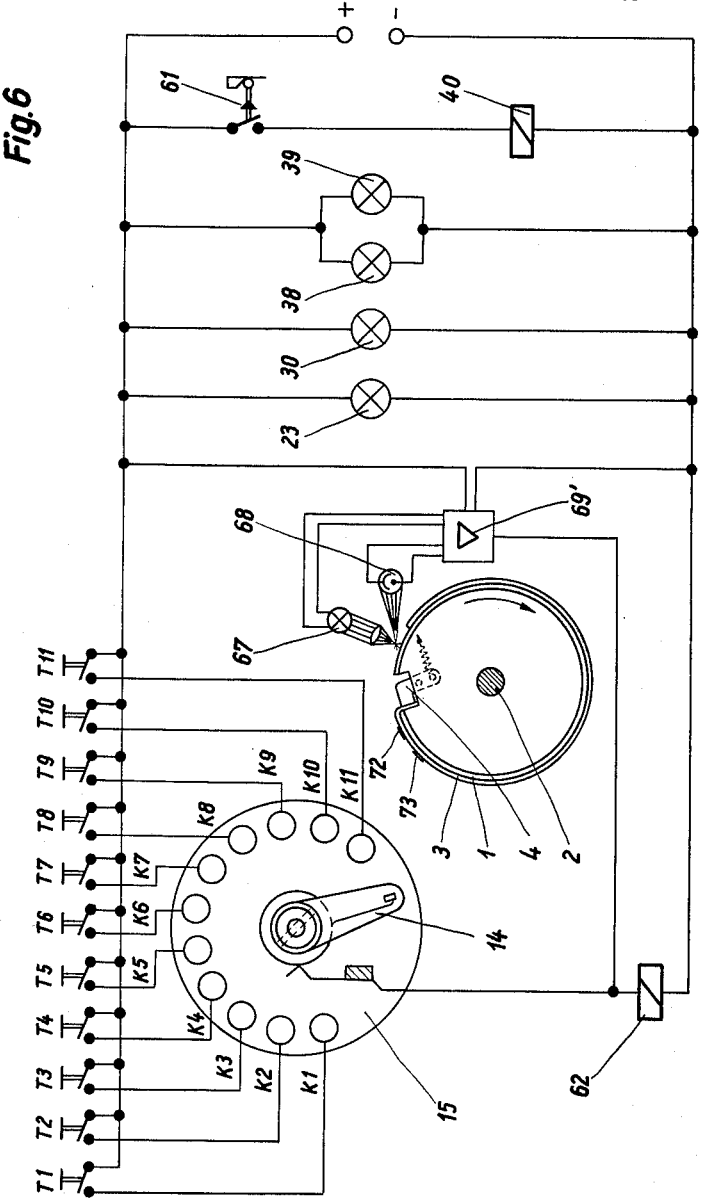

Inventors:
WILHELM RITZERFELD
GERHARD RITZERFELD
by:
Michael S. Striker

Jan. 25, 1966  W. RITZERFELD ETAL  3,230,857
COPY MAKING MACHINE AND COPYING METHOD
Filed July 10, 1962  13 Sheets-Sheet 8

Inventors:
WILHELM RITZERFELD
GERHARD RITZERFELD
by:
Michael S. Striker
RH

Jan. 25, 1966    W. RITZERFELD ETAL    3,230,857
COPY MAKING MACHINE AND COPYING METHOD
Filed July 10, 1962                    13 Sheets-Sheet 12

Inventors
WILHELM RITZERFELD
GERHARD RITZERFELD by: Michael S. Striker

Jan. 25, 1966  W. RITZERFELD ETAL  3,230,857
COPY MAKING MACHINE AND COPYING METHOD
Filed July 10, 1962  13 Sheets-Sheet 13

Inventors:
WILHELM RITZERFELD
GERHARD RITZERFELD
by:
Michael S. Striker

United States Patent Office 3,230,857
Patented Jan. 25, 1966

3,230,857
COPY MAKING MACHINE AND COPYING METHOD
Wilhelm Ritzerfeld, Schorlemer Allee 14, Berlin-Dahlem, Germany, and Gerhard Ritzerfeld, Franzensbader Str. 21, Berlin-Grunewald, Germany
Filed July 10, 1962, Ser. No. 208,779
Claims priority, application Germany, July 27, 1961, R 30,838
28 Claims. (Cl. 95—75)

The present invention relates to copy making machines and to a copying method, and more particularly to a machine and method for making contact copies with short wave light or long wave light passing through a master sheet which is permeable to short wave light or absorbent to long wave light.

Methods for obtaining copies in this manner are known as "Azo process" or "Diazo process." The methods according to the prior art produce copies extending over the entire face of the copy sheet, and the copies correspond to the size of the selected copy sheet. Known methods and machines for producing copies by the action of heat rays are also only concerned with copies whose area corresponds to the size of the copy sheet.

It is one object of the present invention to overcome this disadvantage of known copy making machines and methods and to provide a copy making machine, and a copying method capable of producing on a copy sheet copies of selected sections of the master sheet by causing the passage of light rays or heat rays through adjacent selected section of the master sheet and of the copy sheet.

Another object of the present invention is to prevent a transfer of images from undesired sections of the master sheet to the copy sheet by exposing the respective sections of the copy sheet to diffuse light so that the respective sections are overexposed and cannot form an image.

Another object of the present invention is to provide a copy making machine in which sections of a copy sheet correlated with undesired sections of the master sheet are automatically covered to prevent exposure by rays, whereas copying rays pass through selected sections of the master sheet to corresponding sections of the copy sheet while the respective sections are in adjacent parallel relationship.

In the event that a positive transparent master sheet is used with positive light-sensitive copy sheets, a positive image is formed on the copy sheet. Conversely, a negative transparent master sheet will produce a negative image on a light-sensitive copy sheet, assuming that copy sheets having a "Diazo layer" are used.

If a positive transparent master sheet and a positive halogenide layer, obtained by pre-exposure by means of the Herrschel effect, are used, positive unreversed and legible copies are obtained.

If a negative original and a negative silver halogenide paper are used a positive copy results. For a negative original and a silver halogenide positive layer (produced by the Herrschel effect), a negative copy results.

If long wave light, particularly infrared light, is used to expose heat sensitive copy paper, a colored image is obtained upon contact, whereas the heat sensitive layer of the copy paper is not influenced if the copy paper is spaced from the original since the diffused infrared rays do not produce concentrated heat at the image points, and consequently cannot produce the coloring of the copy sheet.

In accordance with one method of the present invention, sections of the copy sheet corresponding to undesired sections of the master sheet, are subjected to diffused rays to such an extent that the respective sections of the copy sheet cannot receive an image when placed in contact with the master sheet and properly exposed.

In accordance with another method of the invention, desired and undesired sections of the master sheet are transferred to the corresponding sections of the copy sheet, but the image of the undesired sections is destroyed by exposing sections of the copy sheet corresponding to undesired sections of the master sheet to diffused light.

Copies produced by these methods of the invention have images of selected sections of the original only, but if the selected sections of the original are spaced from each other, the images on the copy sheet are correspondingly spaced.

In accordance with another method of the present invention, the master sheet and the copy sheet are transported, but when undesired sections of the master sheet pass through a copying area, the copy sheet is not transported so that the image of the successive desirable section of the master sheet is produced on the copy sheet adjacent the image of the preceding desirable section of the master sheet.

The selection of sections of the master sheet can be carried out by manually operated means, for example manually operated switches, each of which corresponds to a section of the master sheet. However, desired sections of the master sheet, or a corresponding element moving in synchronism with the master sheet, may be marked and sensed by photoelectric means producing control impulses effecting the copying of the corresponding sections of the master sheet only, while the images on unmarked sections are not transferred to the copy sheet.

In a preferred embodiment of the invention, the master sheet is transparent and located inside a hollow transparent cylindrical drum. A mercury vapor high pressure lamp is located in the transparent cylindrical carrier and emits rays passing through the master sheet to the copy sheet. If layers of the "Azo" type or silver halogenide layers are used, an electronic flash lamp may be used.

One method of the invention comprises the steps of moving a master sheet and a copy sheet so as to place sections of the master sheet and the copy sheet successively in cooperating positions in a copying area, causing rays to pass in the copying area through the master sheet and the copy sheet; and subjecting sections of the copy sheet corresponding to undesired sections of the master sheet to diffuse rays so that no image can appear on the same. However, rays passing in the copying area through selected desired sections of the master sheet to the copy sheet, transfer an image from the selected desired section of the master sheet to the copy sheet.

One embodiment of a copy making machine according to the invention comprises carrier means for moving a master sheet through a copying area, transporting means for moving a copy sheet sensitive to rays in synchronism with the master sheet through the copying area in a position in which sections of the master sheet are successively located opposite and adjacent sections of the copy sheet, means for emitting rays at least partly located and constructed to emit copying rays into the copying area to effect the transfer of an image from the section of the master sheet located in the copying area to the adjacent section of the copy sheet; and selector means for preventing transfer of an image from undesired sections of the master sheet to the copy sheet, and for effecting a transfer of an image in said copying area only from desired selected sections of the master sheet to the copy sheet.

In the preferred embodiment of the invention, the carrier is a hollow tubular cylinder which may consist of glass, and has means for holding a transparent master sheet pressed against the inner surface of the cylinder. The master sheet may remain in this position for several revolutions, and is subjected to the rays of short wave light, or long wave light. Preferably, means for forming a slot having a shape corresponding to a section of the copy sheet or master sheet are provided. Rays passing through the slot can impinge only a single section of the copy sheet.

If the copy sheet is pressed against the carrier in the region of the slot, an image of the respective section of the master sheet is transferred to the copy sheet. On the other hand, if a section of the copy sheet is subjected to diffused rays in the region of the slot, the respective section of the copy sheet will be unable to receive an image from the master sheet so that undesired sections of the master sheet will not be copied.

In one embodiment of the invention, means for developing a copy sheet and for drying the copy sheets are provided.

In one embodiment of the invention, a source of light producing intense short wave light rays is used, and a band shaped transporting element holds the copy sheet against the transparent cylinder. Portions of the copy sheet, which are not to be exposed, are covered. Before or after the copying area, a second short wave source of light produces diffused light passing through a shutter forming a slot for over-exposing sections of the copy sheet on which no copied image is to be made. The shutter is operated under control of selector means which are either manually set, or function automatically under control of electric means sensing markings on the master sheet.

In another embodiment, a slot is located in the copying area, and the source of light is a flash lamp which is automatically ignited when selected sections of the master sheet pass the slot and the copying area so that only selected and desired sections of the master sheet are copied on the copy sheet.

In another embodiment of the invention, a source of infrared light is located in a transparent cylindrical carrier which cooperates with a counter-pressure member. When a desired section of the master sheet moves into the copying area, the counter-pressure member is moved to an advanced position for urging the copy sheet toward the transparent carrier and the master sheet so that the selected section of the master sheet is copied. When an undesired section of the master sheet is in the copying area the counter-pressure member is retracted so that the infrared light passing through the respective undesired section of the master sheet is diffused when impinging the copy sheet, so that no image is transferred to the copy sheet.

A stripper means is advantageously provided to separate the copy sheet from the cylinder when the counter-pressure element is retracted to obtain the necessary spacing between the master sheet and the copy sheet when no image transfer is desired.

In another embodiment of the invention, a shutter forming a slot and a source of short wave light are located in the transparent cylinder. A shutter may also be located outside of the transparent cylinder and cover those sections of the master sheet which are not to be copied, while opening under the control of selector means when desired sections of the master sheet enter the copying area.

In a modified embodiment, the counter-pressure means is also controlled by the selector means to move to the advanced position for obtaining copy of a desired section under control of selector means permitting a manual or automatic selection of desired sections of the master sheet. The shutter closes when the counter-pressure member is retracted and the copy paper is separated from the carrier of the master sheet by stripper means which are preferably controlled by the movement of the counter-pressure member.

The counter-pressure member advantageously includes a counter-pressure roller which is rotated when engaged by the transparent cylindrical carrier of the master sheet. In another embodiment, the counter-pressure member includes a set of peripheral sectors, each of which has a circumferential width corresponding to a section of the master sheet and copy sheet, and is movable independently of the other sectors between a retracted position and an advanced position for urging a section of the copy sheet toward the master sheet into a copying position. The sectors are operated by electromagnetic means under the control of selector means. Preferably, a source of short wave light is located within the transparent cylindrical carrier, and a shutter is arranged outside of the cylinder which opens a slot through which the light passes into the copying area only. As long as no counter-pressure sector is advanced to the copying position, the shutter remains closed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevation of a copy making machine according to one embodiment of the invention, with one side wall omitted, and being partially in section;

FIG. 2 is a sectional view illustrating a detail of a modified embodiment otherwise corresponding to the embodiment of FIG. 1;

FIG. 3 is a diagram illustrating the electric circuit of the embodiment of FIG. 1;

FIG. 4 is a diagram illustrating the circuit of the embodiment which is modified in accordance with FIG. 2;

FIG. 5 is a side elevation of a modified embodiment having selector means incorporating photoelectric sensing means, and being partially in section;

FIG. 6 is a diagram illustrating the electric circuit of the embodiment of FIG. 5;

Figure 11:
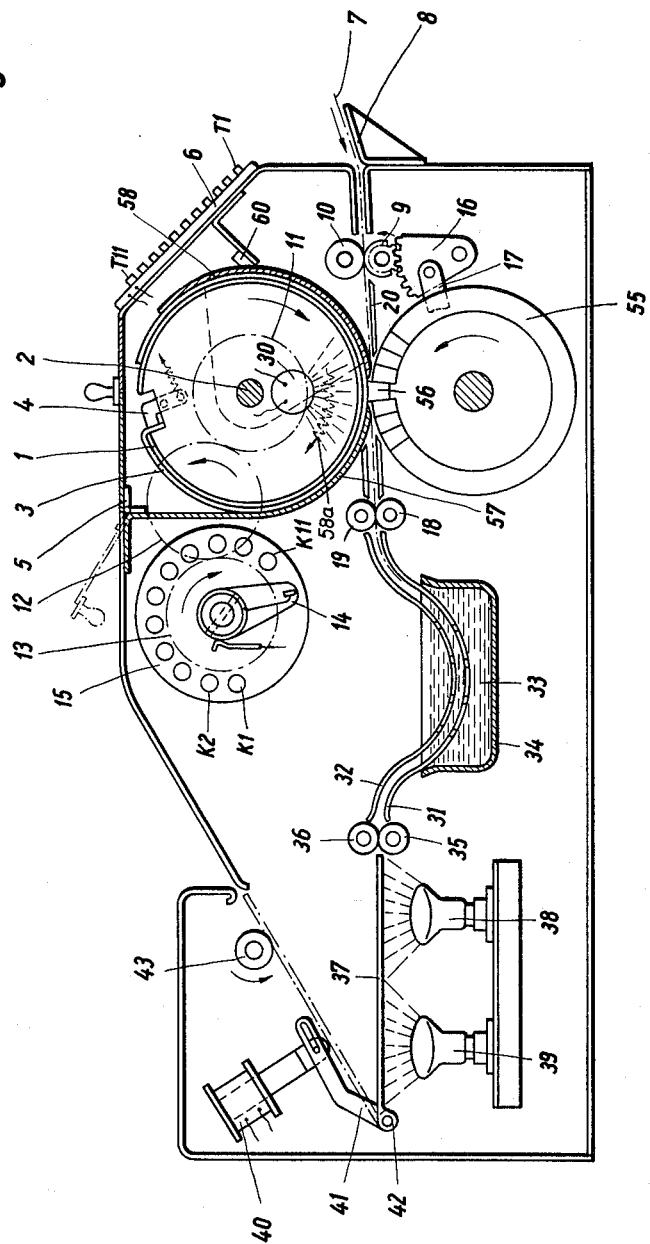
FIG. 11 is a side elevation, partially in cross-section, illustrating another embodiment of the invention having a counter-pressure member including a set of peripheral counter-pressure sectors, the machine being shown in a position in which a copy is made of a selected section of the master sheet.
Figure 12:
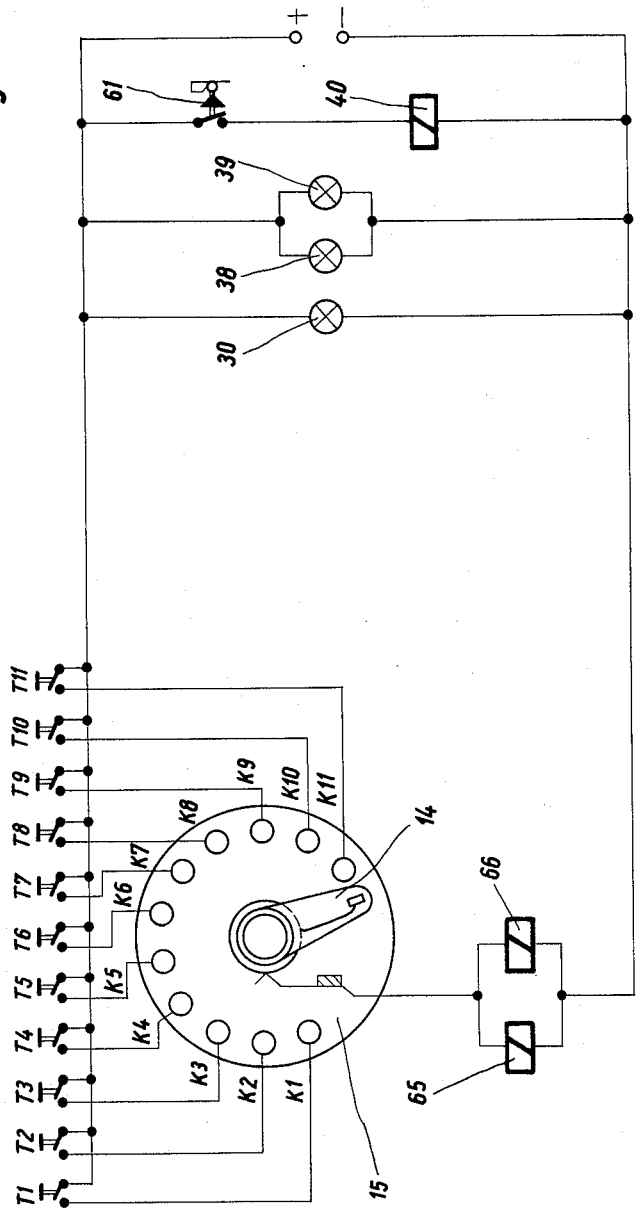
FIG. 12 is a diagram illustrating the electric circuit of the embodiment of FIG. 11.
Figure 13:
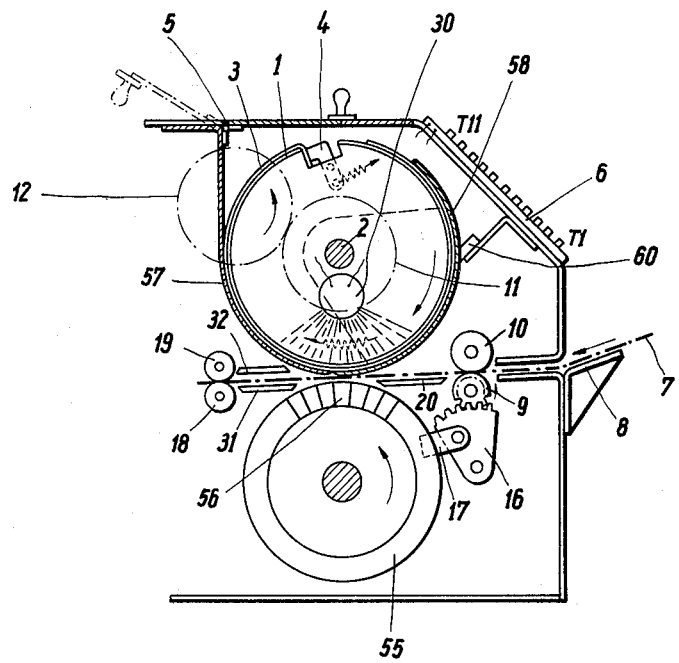
Figure 14:
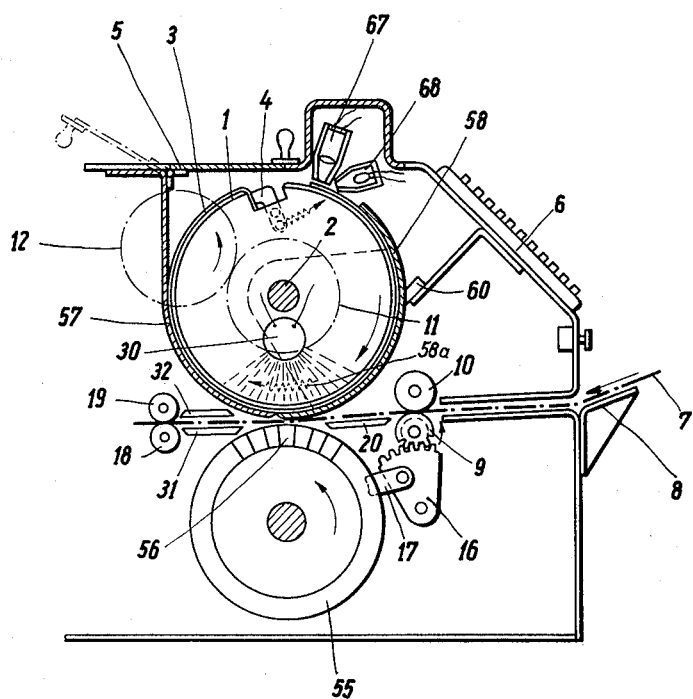

FIG. 13 is a fragmentary side elevation, partially in cross-section, illustrating a portion of the embodiment of FIG. 11 in an operational position in which an undesired section of the master sheet is not copied; and FIG. 14 is a fragmentary side elevation, partially in section, illustrating a portion of the embodiment of FIG. 12 with modified selector means incorporating photoelectric sensing means.

Referring now to the drawings, and more particularly to FIGS. 1 and 2, a hollow cylindrical transparent carrier 1, which may be made of glass, is rotatable about a shaft 2 in clockwise direction and is provided with a holding means 4 by which a master sheet 3 is attached to the outer surface of the carrier 1. Master sheet 3 is attached to carrier 1 while the cover 5 is in the open position illustrated in phantom lines, whereupon drive means including a one revolution clutch, not shown, rotate carrier 1 through 360° so that the master sheet 3 is guided by guide walls 5a into the illustrated position lieing flat on the upper surface of carrier 1. Cover 5 is then closed.

A gear train 11, 12, 13 connects shaft 2 with the shaft of a rotary contact means 14. During revolution of carrier 1, contact 14a of rotary contact means 14 successively passes over and makes contact with a series of selector contacts K1 to K11, each of which is connected to a manually operated selector switch T1 to T11. A slide contact 14c engages the slide ring 14b rotating with contact means 14 and connected to contact 14a. Slide contact 14c is connected to an electromagnetic control means 62 which operates a control shutter 70 located in a casing 21 having a slot 22 in the bottom wall thereof which is normally covered by the shutter 70. A mercury vapor lamp 23 is located in casing 21, and as best seen in FIG. 3 connected to a source of voltage, which is also connected to the selector switches T1 to T11 and to electromagnetic means 62.

A voltage will be applied to the electromagnetic means 62 whenever contact 14a of the rotary contact means 14 engages a contact K1 to T11 whose associated selector switch T1 to T11 is closed, which is the normal condition of the selector switches.

Another mercury vapor lamp 30 is located in carrier 1, and emits rays passing through the transparent wall of carrier 1 and through the master sheet. The source of rays 30 is connected in parallel with a source of rays 23, and is connected to a voltage so that lamps 23, 30 are continuously lighted when the main switch, not shown, of the machine is actuated.

A copy sheet 7, for example a sheet of paper having a light sensitive layer of the "Diazo" type, is placed on the guide 8, and is transported by transporting rollers 9 and 10, roller 9 being fixedly connected to a gear meshing with a gear sector 16 operated by a linkage 17. Linkage 17 is connected to a cam follower cooperating with a cam rotating in synchronism with carrier 1. Consequently, at the beginning of the operation, the copy sheet 7 is transported to the transporting rollers 18 and 19, and passes from there to an endless conveyor band 24 supported and driven by rollers 25, 26, 27, and having a portion following the contour of carrier 1 and being urged against the same by guide rollers 28 and 29. In this manner, the copy sheet is pressed against the master sheet 3 when the copy sheet passes through the copying area.

Further transporting rollers 35, 36 draw the copy sheet through a passage between curved guide members 31, 32 so that the copy sheet is immersed in a developing liquid 33, and is then placed on a movable discharge plate member 37 which is heated by infrared lamps 38 and 39 so that the copy sheet is dried. Discharge member 37 is pivotable about an axis 42, and is connected to a lever arm 41 operated by an electromagnetic means 40. Electromagnetic means 40 is connected in series with an end switch 61, see FIG. 3, which is operated after each revolution so that discharge member 37 is raised to the position shown in phantom lines in FIG. 1 in which the dried copy sheet is transported by a roller 43 to the top of the casing of the machine where the operator can remove it.

The machine is operated in the following manner: It is assumed that the master sheet has a number of sections spaced in circumferential direction about the periphery of carrier 1 and corresponding, for example, to lines or columns of a text. The copy sheet has corresponding sections, and it is intended that desired sections of the master sheet are selected for being copied on corresponding sections of the copy sheet.

Assuming that the master sheet has 11 sections respectively associated with the selector contacts K1 to K11 and with the selector switches T1 to T11, the arrangement is such that a section of the copy sheet corresponding to a certain associated section of the master sheet will be located underneath the slot 22 when contact arm means 14 engages the contact K1 to K11 which is engaged at this moment by contact 14a of contact means 14. If the respective switch T1 to T11 is closed in accordance with a program, electromagnetic means 62 will be energizer, control shutter 70 will be moved in direction of the arrow in FIG. 1 to a position opening slot 22, and the respective section of the copy sheet will be exposed to the light of the source of rays 23 to such an extent that it will not be able to receive any further copied images on exposure by the source of rays 30. However, when one or several of the selector switches T1 to T11 are opened by the operator before the beginning of the operation, electromagnetic means 62 will not be energized when a section of the copy sheet corresponding to a desired and selected section of the master sheet is located underneath slot 22, and consequently the shutter 70 will not be opened, so that the respective section of the copy sheet is not exposed.

The copy sheet is transported into the copying region where the rays of source 30 are effective, so that the rays pass successively through all sections of the master sheet and unto the corresponding sections of the copy sheet, while the same is pressed by the endless band 24 against the master sheet.

Those sections of the copy sheet which were not previously overexposed by the source of rays 23, are now exposed by the source of rays 30, and receive an image of the respective selected section of the master sheet. The overexposed other sections are also subjected to the rays of source 30 passing through undesired sections of the master sheet, but cannot receive an image due to a previous exposure by the source 23. In this manner, certain desired sections of the master sheet are selected for copying by operation of selected switches T1 to T11.

The properly exposed copy sheet passes through the developing liquid 33 to the discharge member 37, is dried by the infrared lamps 38 and 39, and when carrier 1 has completed its revolution, contact 62 is actuated and closed, so that electromagnetic means 40 is energized and raises the discharge member 37 to effect discharge of the dried copy sheet by the discharge roller 43 to the top of the casing of the machine where the operator can easily remove it. When cover 5 is opened, holding means 5 is manually or automatically actuated to release the master sheet or original 3, which is then removed by the operator.

A modified embodiment of the invention corresponds in all respects to the embodiment of FIG. 1 except that the mercury vapor lamp 23 is replaced by a flash lamp 44, as shown in FIG. 2 and that the shutter 17 and the corresponding electromagnetic means 62 are omitted. As shown in FIG. 4, the modified embodiment has an amplifier 69, and the flash lamp 44 is connected in series with the selector means 15 so that the flash lamp 44 is ignited whenever contact 14a engages a selector contact K1 to K11 whose selector switch remains closed. As explained with reference to FIG. 1, whenever a section of the copy sheet corresponding to an undesired section of the master sheet is located under the slot 22, the contact arm means 14 will engage a selector contact whose selector switch is closed so that the respective section of the copy sheet is exposed by the flash lamp, and cannot received a copied image from the respective section of the copy sheet upon exposure by the source of rays 30. However, when one or several selector switches T1 to T11 are open, the flash lamp will not be ignited when the respective section of the copy sheet passes slot 22, so that the respective section or sections of the copy sheet are not exposed and can receive the image of the corresponding desired section of the master sheet when being exposed by the source of light 30 in the copying area where the endless band 24 presses the copy sheet section against the master sheet to obtain a sharp and well defined copy of the respective selected section of the master sheet.

The embodiment illustrated in FIG. 2 and FIG. 4 is particularly suited for copy sheet having a silver halogenide layer.

The embodiment illustrated in FIGS. 5 and 6 corresponds to the embodiment of FIGS. 1 and 3 in every respect and may be operated in exactly the same manner. However, the selector means are improved, since in addition to the manually controlled selector means 15 automatic photoelectric sensing means are provided.

The photoelectric sensing means include a lamp 67 provided with a lens for concentrating the light on a point of carrier 1, or on a point of the master sheet 3. During rotation of carrier 1, the sections of the master sheet 3 will be successively illuminated by the lamp 67, and light will be reflected into the photo cell 68. The desired sections of the master sheet are marked by dark markings shown in FIG. 6 at 72 and 73, and when a thus selected section of the master sheet is illuminated, the dark marking 72 does not reflect the light of lamp 67 in the photocell 68, so that the photocell 68 produces an impulse which is supplied to the electromagnetic means 62. When the photoelectric selector means are used, the manually controlled selector switches T1 to T11 are open, and consequently electromagnetic means 62 is normally de-energized, and shutter 70 is in a position in which slot 22 is open. However, when electromagnetic means 62 receives the amplified impulse from the photocell 68, it is energized and actuates the shutter to close slot 22 so that the respective section of the copy sheet corresponding to a selected and marked section of the master sheet, is not exposed by the diffused light of the source of rays 23. When shutter 70 is in the normal position opening slot 22, the other sections of the copy sheet are overexposed and cannot receive an image of the respective section of the master sheet in the copying area.

When a copy sheet is used which is not marked, the photoelectric sensing means have no effect and can be switched off. Since in the embodiment of FIGS. 5 and 6, the shutter means is normally in the open position, the selector switches T1 to T11 associated with desired sections of the master sheet are closed, and whenever a section of the copy sheet corresponding to a desired section of the master sheet passes the slot 22, electromagnetic means 62 is energized and actuates shutter 70 to close the slot. The circuit of the electromagnetic means 62 is closed over contact means 14, 14a, the respective selector contact K1 to K11, and the respective closed selector switch T1 to T11.

If photoelectric sensing means are combined with the arrangement of FIGS. 1 and 3 in which the shutter 70 and the selector switches T1 to T11 are normally closed, all undesired sections of the master sheets will have to be marked so that the electromagnetic means will be actuated to open shutter 70 when an undesired marked section of the master sheet is sensed by the photoelectric sensing means 67, 68.

Figure 7:
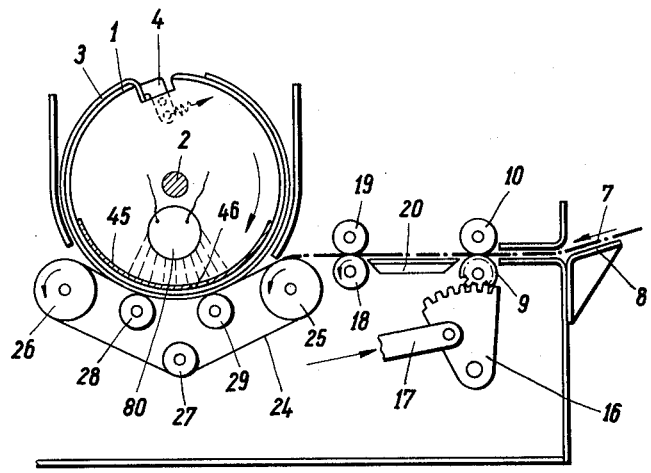
FIG. 7 is a fragmentary side elevation, partially in section, illustrating modified parts of the copy making machine.

The general arrangement of the embodiment of FIG. 7 corresponds to the apparatus shown in FIG. 5, and corresponding developing means, drying means and selector means are provided. However, the undesired sections of the copy sheet are not pre-exposed.

Within the transparent carrier 1, a flash lamp 80 is located to emit rays into the copying area in which the copy sheet is pressed against the master sheet by the endless band 24. A diaphragm wall 45 is stationarily mounted and located within the rotary transparent carrier 1. Wall 45 has a slot 46 located in the copying area and having a shape corresponding to the outline of a sector of the master sheet and of the copy sheet. The flash lamp 80 is connected in series with the selector means, and the electric circuit of the embodiment of FIG. 7 corresponds to the circuit shown in FIG. 6 with the flash lamp 80 replacing electromagnetic means 62, and with lamps 23 and 30 omitted.

Consequently, whenever a desired section of the master sheet marked in accordance with a program is sensed by the photoelectric sensing means 67, 68, or whenever contact arm 14 passes over a selector contact K1 to K11 whose associated selector switch T1 to T11 was closed by the operator in accordance with a program, flash lamp 80 will be ignited, and since in this moment the desired section of the master sheet registers with slot 46, the respective section of the master sheet is exposed to the light of the flash lamp 80, and the image thereon is transferred to the corresponding superimposed section of the copy sheet which at this moment also registers with slot 46.

Since in the embodiment of FIG. 7 the source of rays within the carrier 1 does not act on undesired sections of the master sheet and copy sheet, it is not necessary to pre-expose the undesired sections of the copy sheet in the manner of the embodiments of FIGS. 1, 2 and 5.

Copy sheets having a layer of the "Diazo" type or a silver halogenide layer may be used in this embodiment.

When selected sections of the master sheet have been transferred to the copy sheet, the same is transported to a developing liquid, and then dried as explained with reference to FIG. 1.

The embodiment of FIG. 8 has a transparent cylindrical carrier 1 for a master sheet 3, which may be marked as described with reference to FIG. 6 so as to be sensed by photoelectric sensing means 67, 68. Selector means 15 corresponding to the selector means 15 described with reference to FIG. 6 are provided. A source of infrared rays 81 is located in the transparent cylindrical carrier 1 and connected to a source of voltage as described for the source of light 30 with reference to FIG. 6.

A curved arcuate diaphragm wall 45 is stationarily mounted and projects into the rotating carrier 1. Slot 46 in wall 45 has a shape corresponding to a section of the master sheet 3, so that the infrared rays of lamp 81 can only impinge a single section of the master sheet which registers at any moment with slot 46. Transporting rollers 9 and 10 transport the copy sheet into the copying-area, and other transporting rollers 78, 83, 85, 86 transport the copy sheet further to the discharge member 104 which is operated by an electromagnetic means 40 as described with reference to FIG. 1, an end contact being provided which after each revolution of carrier 1 effects energization of electromagnetic means 40. The copy sheet 7 has a heat sensitive layer, so that an image is transferred from a section of the master sheet registering with slot 46 to the respective adjacent section of the copy sheet when the same is in contact with the master sheet. However, if the copy sheet is spaced from the master sheet, diffused rays fall on the copy sheet and consequently no image is formed on the copy sheet.

Figure 8:
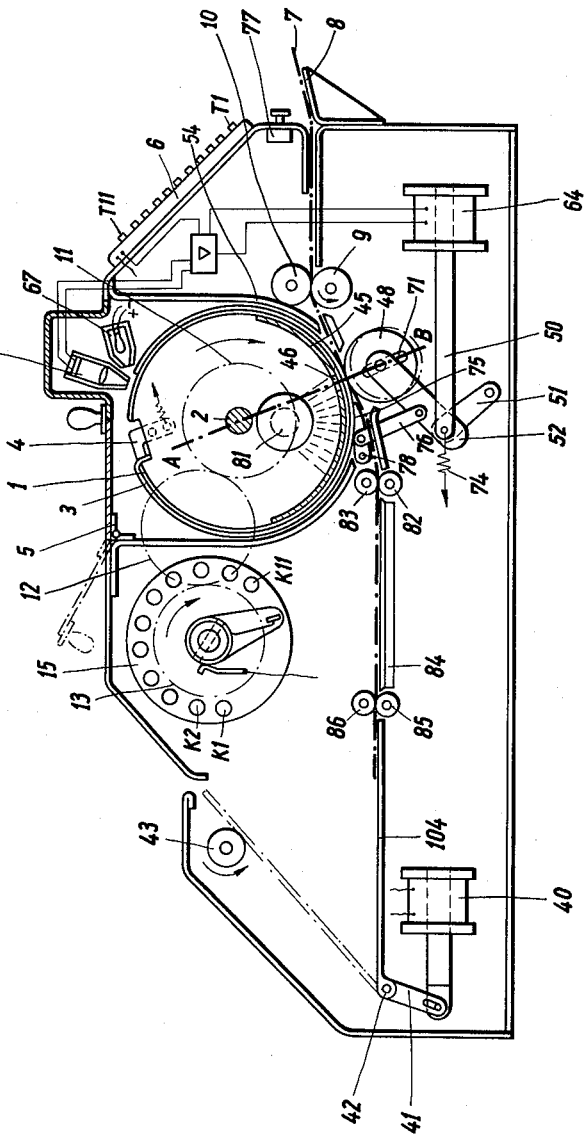
FIG. 8 is a side elevation, partially in cross-section, illustrating another embodiment of the invention incorporating an infra-red source of light, and a counter-pressure roller, and employing a dry process.

In the embodiment of FIG. 8, sections of the copy sheet are placed in contact with the corresponding sections of the master sheet when the same are desired to be copied, while the copy sheet is moved to a position spaced from the master sheet when undesired sections of the master sheet are located in the copying plane A–D.

Control means are provided for this purpose, and include a counter-pressure roller 48, having a shaft guided in slots extending in direction of the plane A–D, and toggle levers 51, 52 which are controlled by the armature 50 of an electromagnetic means 64. A stripper 75 is mounted on a pivot 78, and controlled by a link 76 pivotally connected to toggle lever 52. A spring 74 urges the toggle lever 52 to a position in which counter-pressure roller 45 is retracted from carrier 1, and stripper means 75 urges the copy sheet to move away from the master sheet and to engage the peripheral surface of the counter-pressure roller 45. When electromagnetic means 64 is energized, counter-pressure roller 45 is moved to the advanced position illustrated in solid lines in FIG. 8, and stripper 75 is raised to a position permitting the copy sheet to be pressed against the master sheet in the region of the slot 46.

The electromagnetic control means 64 is connected into the circuit of the selector means in the same manner as the electromagnetic means 62 is connected in the circuit of FIG. 6. Consequently, whenever the photoelectric sensing means 67, 68 create an impulse upon sensing a selected section of the master sheet, electromagnetic means 64 is energized and effects movement of the counter-pressure roller to its advanced, copying position. In the moment in which the respective selected desired section of the master sheet registers with slot 46 so that a section of the copy sheet is pressed against the selected section of the master sheet and a sharp image is transferred from the master sheet to the copy sheet.

When an undesired section of the master sheet passes slot 46, electromagnetic means 46 is not energized, and spring 74 effects movement of the counter-pressure roller 45 to its retracted position, and actuation of stripper 75 which moves the copy sheet away from the master sheet. Consequently, only diffused infrared rays impinge the respective section of the copy sheet, and no image is transferred from the undesired section of the master sheet to the copy sheet.

Since a dry process is used by the machine illustrated in FIG. 8, no developing liquids, and no drying lamps are required, and the copy sheet is guided over a plate 84 to the discharge plate member 104.

Since every selected section of the master sheet is circumferentially spaced from the photoelectric sensing means 67, 68 when registering with the slot 46, the markings on the master sheet are correspondingly spaced from the respective sections of the master sheet, and may be provided on a strip attached to the master sheet.

The electromagnetic means 64 are also connected in series with the selector means 15, so that sections of the master sheet can also be selected by operation of the selector switches T1 to T11.

Figure 9:
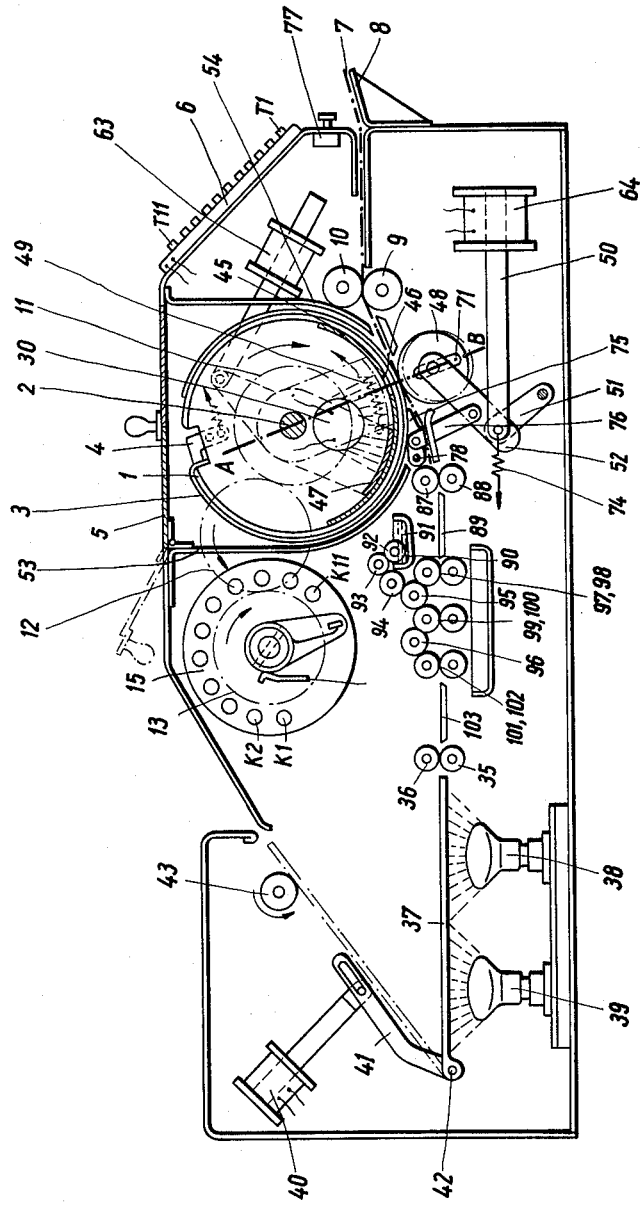
FIG. 9 is a side elevation, partially in cross-section, illustrating another embodiment incorporating a counter-pressure roller, and a shutter controlled by selector means, and employing a surface developing process.
Figure 10:
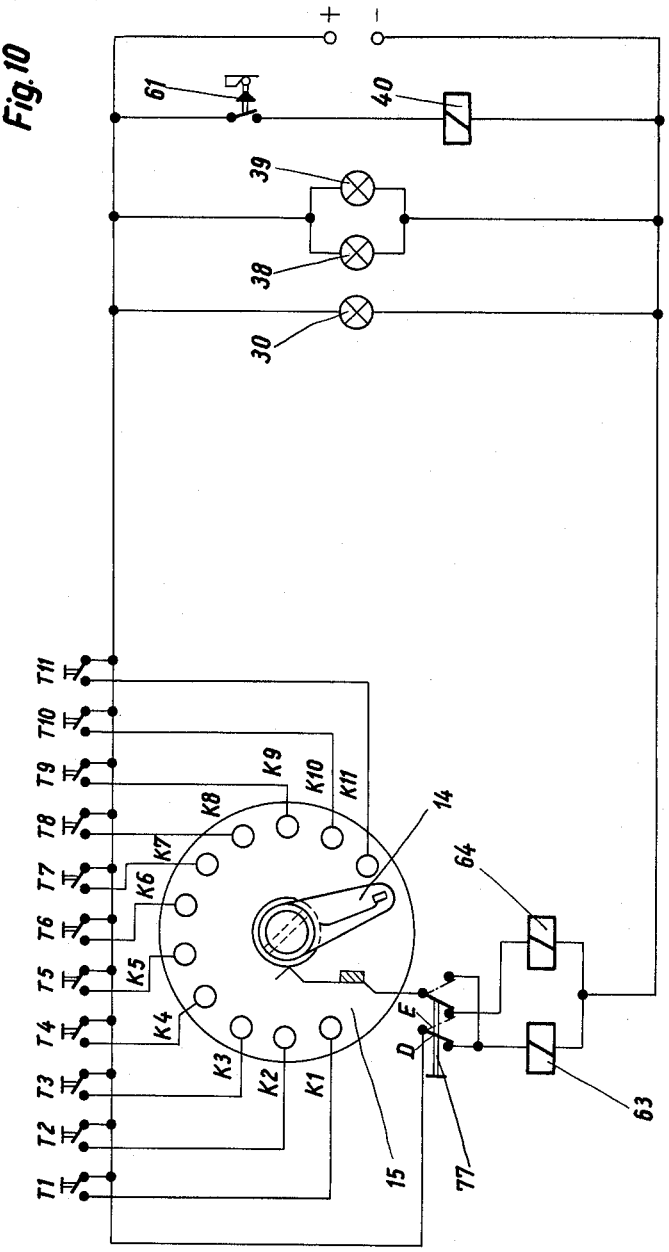
FIG. 10 is a diagram illustrating the electric circuit of the embodiment of FIG. 9.

In the embodiment of FIGS. 9 and 10, a stripper 75 and counter-pressure means including a counter-pressure roller 48 are provided which are operated in the manner described with reference to FIG. 8. A member 45 having a slot 46 is located in the transparent cylindrical carrier 1 so that the rays of the source 30 transfer the image of a single selected section of the master sheet to the corresponding section of the copy sheet when the same is pressed by counter-pressure roller 48 against the master sheet. A shutter means 47 has an arcuate yoke portion sliding on the inner surface of wall 45 and having an inoperative position shown in FIG. 9 and an operative position covering slot 46. Member 47 is U-shaped and has two legs mounted for turning movement on shaft 2, and a projecting arm connected to the armature of an electromagnetic means 63 which is connected in parallel with electromagnetic means 64, as shown in FIG. 10. A switch 77 can be shifted between a position D connecting electromagnetic means 64 in series with the selector means 15 and electromagnetic means 63 to the voltage source, and a position E connecting electromagnetic means 63 in series with the selector means 15, and electromagnetic means 64 to the voltage source.

In the position D of switch 77, electromagnetic means 63 is energized and holds shutter means 47 in the position in which slot 46 is open, while electromagnetic means 64 is energized in accordance with the selection of the selector switches T1 to T11, to operate a counter-pressure means. This position of switch 77 is used for positive copies in a method corresponding to the method described with reference to FIG. 8.

In the position E of switch 77, electromagnetic means 64 is continuously energized, and holds counter-pressure roller in its advanced operative positions so that all sections of the master sheet and of the copy sheet pass the copying plane A, B and slot 46 in a position permitting copying by the rays of lamp 30, but since electromagnetic means 63 is only energized when a circuit is established by operation of one or several selector switches T1 to T11 and the contact arm 14 passes over the respective selector contact K1 to K11, the shutter 47 is normally held by spring 49 in the position closing slot 46, and is only moved to the open position when desired and selected section of the master sheet register with slot 46.

Transporting rollers 78, 88, transport the copy sheet to three pairs of rollers 97 to 102 which are moistened by rollers 95, 96 receiving moisture from rollers 92 to 94, roller 92 being located in a developing liquid 91 in a container 90. Guide members 89 and 103 support the copy sheet during passage through the moistening rollers which cause development of the image on the copy sheet. Transporting rollers 35, 36 transport the copy sheet to the discharge member 37 which is heated by infrared lamps 38 and 39 so that the copy sheet is dried.

When end switch 61 is operated under control of carrier 1, electromagnetic means 40 is energized and effects a turning movement of discharge member 37 to the discharge position shown in phantom lines in which transporting roller 43 transports the copy sheet to the top of the casing.

In the position D of switch 77, slot 46 remains open, and counter-pressure roller 48 is moved to the advanced copying position when a selected section of the master sheet passes slot 46. Consequently a sharp copy is made of the selected section. When an undesired section of the master sheet passes slot 46, counter-pressure roller 48 is withdrawn by spring 74 since electromagnetic means 64 is de-energized, and only diffused light impinges the copy sheet which is retracted by stripper 75, and no image is transferred to the copy sheet.

In the position E of switch 77, slot 46 is opened by shutter 47 when selected and desired sections of the master sheet register with slot 46, and it is closed by the shutter means 47 when undesired sections of the master sheet pass slot 46. Therefore, it is not necessary to retract the counter-pressure roller 48.

The embodiment illustrated in FIGS. 11, 12 and 13 operates with copy sheets having a layer of a "Diazo" type, and developing means 33 and the infrared drying lamps 38 and 39 are the same as described with reference to FIG. 1. In the embodiment of FIG. 11 only manually operated selector means including selector switches T1 to T11, and a rotary contact means are provided, whereas in the embodiment of FIG. 14, photoelectric sensing means 67, 68 are additionally provided as described with reference to FIG. 6. The embodiment of FIG. 14 corresponds otherwise to the embodiment illustrated in FIGS. 11, 12 and 13.

A counter-pressure roller means is provided in the form of a rotary cylinder 55 which comprises a set of peripheral circumferentially arranged sectors 56, each of which can be individually moved from a retracted inner position shown in FIG. 13 to an advanced copying position shown in FIG. 11. An electromagnetic means 65, when energized, shifts the sector 56 which is located in the copying area to the advanced position. Counter-pressure member 55 is driven to rotate in synchronism with carrier 1 and rotary contact arm 14. An arcuate shutter element 58 has legs turnable on shaft 2, and is operated by an electromagnetic means 66 as described with reference to electromagnetic means 63 in the embodiment of FIG. 9.

Whenever contact arm means 14 engages a selector contact K1 to K11, connected to an actuated and closed selector switch T1 to T11, electromagnetic means 65 and 66 will be energized, so that electromagnetic means 66 retracts shhutter 58 which forms in the copying area a slot with the wall 57, whereupon electromagnetic means 65 operates sector 56 to move to the advanced position shown in FIG. 11 in which a section of the copy sheet, whose outline corresponds to the peripheral face of sector 56, is pressed against the corresponding selected section of master sheet 3.

Means are provided for delaying the operation of electromagnetic means 65 so that the shutter 58 has already opened when sector 56 is advanced. Similarly, in the embodiment of FIGS. 9 and 11, the actuation of electromagnetic means 64 is delayed to take place after electromagnetic means 63 has moved shutter 47 to the open position so that the slot 46 is already open when the counter-pressure roller presses the copy sheet against the master sheet. When the counter-pressure roller 48 is retracted, the deenergizing of the electromagnetic means 63 is delayed so that spring 49 moves shutter 47 to the position closing slot 46 so that no diffused light can impinge the copy sheet retracted by stripper 75 when counter-pressure 48 is retracted by spring 74 upon deenergization of electromagnetic means 64.

Referring again to the embodiment of FIGS. 11 to 14, only selected sections of the master sheet are copied since sector 56 and shutter 58 assume the position shown in FIG. 11 only when the selector means close the circuit of electromagnetic means 65 and 66. All other parts of the master sheet are covered by wall 57, shutter 58 and by the wall 60 in the casing.

In the position of FIG. 13 an undesired section of the master sheet passes the copying area, and since no circuit is completed by the selector means in this position, the shutter 58 is closed by spring 58a, while the sector 56 which passes through the copying area remains retracted, electromagnetic means 65 and 66 being de-energized. Since the shutter is completely closed, not even diffused light can reach the copy sheet which is transported by rollers 9, 10, 18 and 19 through the copying area.

It will be understood that each of the elements described above, or two or more together, may also find a useful application in other types of copy making machines and copying methods, differing from the types described above.

While the invention has been illustrated and described as embodied in a copy making machine for copying selected sections of a master sheet onto a light sensitive copy sheet, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of the equivalence of the following claims.

What is claimed as new and desired to be secured by Letters Patent is:

1. A copy making machine, comprising, in combination, carrier means for moving a master sheet having a plurality of section through a copying area so that said sections are successively located in said copying area; transporting means for moving a copy sheet sensitive to rays in synchronism with said master sheet through said copying area in a position in which said sections of said master sheet are successively located opposite and adjacent sections of said copy sheet; means for emitting rays to which said copy sheet is sensitive at least partly located and constructed to emit copying rays into said copying area to effect the transfer of an image from the section of the master sheet located in said copying area to the adjacent section of said copy sheet; control means for preventing transfer of an image from undesired sections of said master sheet to said copy sheet and for effecting a transfer of an image in said copying area from desired selected sections of said master sheet to said copy sheet; and selector means settable in accordance with a program for selecting desired sections of said master sheet for copying and including a member moving in synchronism with said carrier means and transporting means, and operatively connected with said control means for automatically actuating the same in accordance with the program whereby only desired sections of the master sheet are copied.

2. A copy making machine, comprising, in combination, a rotary hollow transparent cylindrical carrier means having means for securing a master sheet having a plurality of sections thereto so that the master sheet is moved through a copying area during rotation of said carrier means so that said sections are successively located in said copying area; transporting means for moving a copy sheet sensitive to rays in synchronism with said master sheet through said copying area in a position in which said sections of said master sheet are successively located opposite and adjacent sections of said copy sheet; means for emitting rays to which said copy sheet is sensitive at least partly located in said carrier means for emitting rays through the same into said copying area to effect the transfer of an image from the section of the master sheet located in said copying area to the adjacent section of said copy sheet; control means for preventing transfer of an image from undesired sections of said master sheet to said copy sheet and for effecting a transfer of an image in said copying area from desired selected sections of said master sheet to said copy sheet; and selector means settable in accordance with a program for selecting desired sections of said master sheet for copying and including a member moving in synchronism with said carrier means and transporting means, and operatively connected with said control means for automatically actuating the same in accordance with the program whereby only desired sections of the master sheet are copied.

3. A copy making machine, comprising, in combination, carrier means for moving a master sheet through a copying area; transporting means for moving a copy sheet sensitive to rays in synchronism with said master sheet through said copying area in a position in which sections of said master sheet are successively located opposite and adjacent sections of said copy sheet; a first source for emitting rays to which said copy sheet is sensitive located to emit copying rays into said copying area to effect the transfer of an image from the section of the master sheet located in said copying area to the adjacent section of said copy sheet; a second source for emitting diffused rays to which said copy sheet is sensitive and being located in the region of said transporting means to overexpose sections of said copy sheet before the respective sections enter said copying area; shutter means for forming a slot between said second source and said copy sheet, said slot having a shape corresponding to a section of said copy sheet; and selector means operating in synchronism with said carrier means and with the movement of said master sheet, and connected to said shutter means for opening said slot when sections of the copy sheet corresponding to undesired sections of said master sheet pass said slot whereby the respective sections of the copy sheet are overexposed whereby in said copying area said first source effects a transfer of an image only from desired selected sections of said master sheet to said copy sheet.

4. A copy making machine, comprising, in combination, a rotary hollow transparent cylindrical carrier means having means for securing a master sheet thereto so that the master sheet is moved through a copying area during rotation of said carrier means; transporting means for moving a copy sheet sensitive to rays in synchronism with said master sheet through said copying area in a position in which sections of said master sheet are successively located opposite and adjacent sections of said copy sheet; a first source for emitting rays to which said copy sheet is sensitive located in said carrier means for emitting copying rays into said copying area to effect the transfer of an image from the section of the master sheet located in said copying area to the adjacent section of said copy sheet; a second source for emitting diffused rays to which said copy sheet is sensitive and being located in the region of said transporting means to overexpose sections of said copy sheet before the respective sections enter said copying area; shutter means for forming a slot between said second source and said copy sheet, said slot having a shape corresponding to a section of said copy sheet; and selector means operating in synchronism with said carrier means and with the movement of said master sheet, and connected to said shutter means for opening said slot when sections of the copy sheet corresponding to undesired sections of said master sheet pass said slot whereby the respective sections of the copy sheet are overexposed whereby in said copying area said first source effects a transfer of an image only from desired selected sections of said master sheet to said copy sheet.

5. A machine as set forth in claim 4 wherein said selector means include manually activated selector contacts respectively correlated with sections of said master sheet, rotary contact means driven in synchronism with said carrier means to cooperate with said selector contacts and electro magnetic means electrically connected to said contact means and operatively connected to said shutter means to operate the same in accordance with the selection of said selector contacts.

6. A machine as set forth in claim 4, said selector means including photoelectric means responsive to markings on sections of said master sheet to produce an impulse, and electromagnetic means connected to said shutter means to operate the same under control of said impulses.

7. A copy making machine, comprising, in combination, a rotary hollow transparent cylindrical carrier means having means for securing a master sheet having a plurality of sections thereto so that the master sheet is moved through a copying area during rotation of said carrier means so that said sections are successively located in said copying area; transporting means for moving a copy sheet sensitive to rays in synchronism with said master sheet through said copying area in a position in which said sections of said master sheet are successively located opposite and adjacent sections of said copy sheet; means for emitting rays to which said copy sheet is sensitive and including an electronic flash lamp located in said carrier means for emitting copying rays for short time periods into said copying area to effect the transfer of an image from the section of the master sheet located in said copying area to the adjacent section of said copy sheet; means for forming a slot located in the region of said copying area and having a shape corresponding to the shape of a section of said master sheet and of said copy sheet so that the rays of said lamp are confined to said opposite sections; and selector means settable in accordance with a program for selecting desired sections of said master sheet for copying and including a member rotation in synchronism with said carrier means and transporting means and means for producing an electric impulse when selected sections of said master sheet selected in accordance with said program enter said copying area, said last mentioned means being electrially connected to said flash lamp for effecting the emission of light rays when selected sections of said master sheet are in said copying area whereby a transfer of an image is effected in said copying area only from desired selected sections of said master sheet to said copy sheet.

8. A copy making machine, comprising, in combination, a rotary hollow transparent cylindrical carrier means having means for securing a master sheet thereto so that the master sheet is moved through a copying area during rotation of said carrier means; transporting means for moving a copy sheet sensitive to rays in synchronism with said master sheet through said copying area in a position in which sections of said master sheet are successively located opposite and adjacent corresponding correlated sections of said copy sheet; a source of rays located in said carrier means and emitting rays into said copying area; means for forming a slot between said source and said copy sheet in said copying area, said slot having a shape corresponding to the shape of a section of said master sheet and copy sheet; a counter pressure means movable between a retracted position and an advanced position located closely spaced from said carrier means in said copying area for urging said copy sheet toward said master sheet; operating means for moving said counter pressure means between said positions; and selector means operating in synchronism with said carrier means and with the movement of said master sheet and being operatively connected to said operating means for moving said counter pressure means to said advanced position when selected sections of said master sheet register with said slot whereby images are transferred to corresponding sections of said copy sheet whereas rays from said source passing through said slot in said retracted position of said counter pressure means impinge in diffused condition on undesired sections of said copy sheet and no images are transferred from undesired sections of said master sheet to corresponding sections of said copy sheet.

9. A machine as set forth in claim 8 wherein said selector means include manually operated selector switches, selector contacts respectively correlated with sections of said master sheet connected to said switches, and rotary contact means driven in synchronism with said carrier means to successively cooperate with said selector contacts; and wherein said operating means include electro-magnetic means for moving said counter pressure roller means to said advanced position, and spring means for moving the counter pressure roller means to said retracted position, said electromagnetic means being connected to said selector contacts and to said rotary contact means to be operated when selected sections of said master sheet enter the said copying area.

10. A machine as set forth in claim 8, said selector means including photoelectric means responsive to markings on selected sections of said master sheet to produce an impulse; and wherein said operating means include electromagnetic means for moving said counter pressure roller means to said advanced position and being controlled by said impulse.

11. A copy making machine, comprising, in combination, a rotary hollow transparent cylindrical carrier means having means for securing a master sheet thereto so that the master sheet is moved through a copying area during rotation of said carrier means; transporting means for moving a copy sheet sensitive to rays in synchronism with said master sheet through said copying area in a position in which sections of said master sheet are successively located opposite and adjacent corresponding correlated sections of said copy sheet; a source of rays located in said carrier means and emitting rays into said copying area; shutter means for forming a slot between said source and said copy sheet in said copying area, said slot having a shape corresponding to the shape of a section of said master sheet and copy sheet; first operating means for actuating said shutter means; a counter pressure means movable between a retracted position and an advanced position located closely spaced from said carrier means in said copying area for urging said copy sheet toward said master sheet; second operating means for moving said counter pressure means between said positions; selector means operating in synchronism with said carrier means and with the movement of said master sheet and being operatively connected to said second operating means for moving said counter pressure means to said advanced position when selected sections of said master sheet register with said slot whereby images are transferred to corresponding sections of said copy sheet, and being connected to said first operating means for effecting closure of said slot when sections of said copy sheet corresponding to undesired sections of said transfer sheet register with said slot and when said counter pressure means is in said retracted position whereby rays from said source transfer images only from selected sections of said master sheet to corresponding sections of said copy sheet.

12. A machine as set forth in claim 11 and including means for developing the images on said copy sheet, and means for drying said copy sheet.

13. A machine as set forth in claim 11 wherein said selector means includes means for producing an electric impulse when a selected section of said master sheet is located in said copying area, and including electromagnetic means for operating said counter pressure means and said shutter means and being controlled by said impulse.

14. A machine as set forth in claim 13 wherein said means for producing electric impulses includes a first means having a plurality of manually selectable switches, selector contacts connected to said switches, and a rotary contact means rotating in synchronism with said carrier means so that an impulse is produced when said contact means engages a selected contact, and a second means including photoelectric means responsive to markings on selected sections of said master sheet to produce impulses.

15. A machine as set forth in claim 11 wherein said selector means includes means for producing electric impulses when a selected section of said master sheet is located in said copying area, circuit means for conducting said impulses to said operating means, and switch means in said circuit means for selectively connecting said first or said second operating means to said means for producing impulses.

16. A copy making machine, comprising, in combination, a rotary hollow transparent cylindrical carrier means having means for securing a master sheet thereto so that the master sheet is moved through a copying area during rotation of said carrier means; transporting means for moving a copy sheet sensitive to rays in synchronism with said master sheet through said copying area in a position in which sections of said master sheet are successively located opposite and adjacent corresponding correlated sections of said copy sheet; a source of rays located in said carrier means and emitting rays into said copying area; shutter means located outside of said carrier means and being operable to form a slot between said source and said copy sheet in said copying area; first operating means for operating said shutter means; a rotary counter pressure member located opposite said carrier means and forming with the same a passage for copy sheets in copying area, said counter pressure member including a plurality of peripheral sectors, each sector being movable between a retracted position and an advanced position for urging a section of said copy sheet toward a corresponding section of said master sheet, each sector having a shape corresponding to a single section; second operating means for moving each sector to said advanced position when located in said copying area; selector means operating in synchronism with said carrier means for producing an electric impulse whenever a selected section of said master sheet is located in said copying area, said selector means being connected to said first and second operating means to actuate the same only when selected sections of said master sheet are located in said copying area whereby rays from said source pass through said slot while an advanced sector urges sections of said master sheet and said copy sheet toward each other, and so that said slot is closed and the respective sector retracted when undesired sections of said master sheet are located in said copying area.

17. A machine as set forth in claim 16 wherein each of said operating means include an electromagnetic means.

18. A machine as set forth in claim 17 wherein said selector means include a plurality of manually operated selector switches respectively correlated with sections of said master sheet, a plurality of selector contacts respectively connected to said switches, rotary contact means driven in synchronism with said carrier means to successively engage said selector contacts, said contacts and said rotary contact arm being connected to said electromagnetic means.

19. A machine as set forth in claim 16 and including a discharge member movable between a position for receiving a copy sheet after the same has passed through said copying area, and a discharge position; electromagnetic means for operating said discharge member; and a switch means controlled by said carrier means and connected to said electromagnetic means for effecting movement of said discharge member to said discharge position after each revolution of said carrier means.

20. A machine as set forth in claim 2 and including a discharge member movable between a position for receiving a copy sheet after the same has passed through said copying area, and a discharge position; electromagnetic means for operating said discharge member; and a switch means controlled by said carrier means and connected to said electromagnetic means for effecting movement of said discharge member to said discharge position after each revolution of said carrier means.

21. A machine as set forth in claim 1 and including means for developing the copy sheet; means for drying the copy sheet, and wherein said transporting means include means for moving said copy sheet to said developing means and to said drying means.

22. A machine as set forth in claim 2 wherein said transporting means include a band conveyor having a curved portion for urging the copy sheet against said cylindrical carrier means in the region of said copying area.

23. A machine as set forth in claims 13 and including stripper means located between said carrier means and said transporting means for separating a copy sheet from said carrier means, said stripper means being connected to said operating means for said counter pressure means to be actuated when said counter pressure means moves to said retracted position.

24. A machine as set forth in claim 23 wherein said source of rays emits infrared rays.

25. A machine as set forth in claim 16 wherein said source emits shortwave light rays.

26. A copy making machine as set forth in claim 1 wherein said selector means include a plurality of manually operated switches respectively correlated with said sections of said master sheet, a plurality of contacts respectively connected with said manually operated switches, and a contact on said member successively engaging said contacts during movement of said member in synchronism with said carrier means.

27. A copy making machine as set forth in claim 1 wherein said selector means include sensing means for sensing markings provided on selected sections of said copy sheet in accordance with a program, a plurality of contacts respectively correlated with said sections of said master sheet and connected to said sensing means, and a contact on said member successively engaging said contacts during movement of said member in synchronism with said carrier means.

28. A copy making machine, comprising, in combination, a rotary hollow transparent cylindrical carrier means having means for securing a master sheet having a plurality of sections thereto so that the master sheet is moved through a copying area during rotation of said carrier means so that said sections are successively located in said copying area; transporting means for moving a copy sheet sensitive to rays in synchronism with said master sheet through said copying area in a position in which said sections of said master sheet are successively located opposite and adjacent sections of said copy sheet; means for emitting rays to which said copy sheet is sensitive at least partly located in said carrier means for emitting rays through the same into said copying area to effect the transfer of an image from the section of the master sheet located in said copying area to the adjacent section of said copy sheet; means for forming a slot located opposite at least a part of said ray emitting means, said slot having a shape corresponding to the shape of a section of said copy sheet, so that rays passing through said slot can impinge only a single section of said copy sheet when said copy sheet is closely spaced from said slot; a shutter in the region of said means for emitting rays and being operable for preventing transfer of an image from undesired sections of said master sheet to said copy sheet, and for effecting a transfer of an image in said copying area from desired selected sections of said master sheet to said copy sheet; electromagnetic means for actuating said shutter means; and selector means settable in accordance with a program for selecting desired sections of said master sheet for copying and including a contact member rotating in synchronism with said carrier means and operatively connected with said electromagnetic means for automatically actuating the same in accordance with the program whereby only desired sections of the master sheet are copied.

References Cited by the Examiner

UNITED STATES PATENTS

| | | | |
|---|---|---|---|
| 519,800 | 5/1894 | Walker | 95—79 |
| 2,245,563 | 6/1941 | Berggren | 95—79 |
| 2,371,925 | 3/1945 | Schade | 95—77.5 |
| 2,820,907 | 1/1958 | Silverman | 88—24 |
| 2,830,492 | 4/1958 | Goodwin | 88—24 |
| 2,947,217 | 8/1960 | McWhirter | 88—24 |

JOHN M. HORAN, *Primary Examiner.*

NORTON ANSHER, *Examiner.*